United States Patent
Kadla et al.

(10) Patent No.: US 6,765,028 B2
(45) Date of Patent: Jul. 20, 2004

(54) POROUS FIBERS FROM NATURAL/ SYNTHETIC POLYMER BLENDS

(75) Inventors: John F. Kadla, Raleigh, NC (US); Richard D. Gilbert, Apex, NC (US); Richard A. Venditti, Raleigh, NC (US); Satoshi Kubo, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/321,939

(22) Filed: Dec. 16, 2002

(65) Prior Publication Data

US 2003/0212157 A1 Nov. 13, 2003

Related U.S. Application Data

(60) Provisional application No. 60/340,346, filed on Dec. 14, 2001.

(51) Int. Cl.$^7$ ................................ C08J 9/26; C08J 9/28; C08J 9/02
(52) U.S. Cl. ...................... 521/61; 264/45.9; 264/46.1; 264/59; 521/77
(58) Field of Search ................... 521/61, 77; 264/45.9, 264/46.1, 59

(56) References Cited

U.S. PATENT DOCUMENTS

| | | | | |
|---|---|---|---|---|
| 4,115,492 A | * | 9/1978 | Mahoney et al. | 264/49 |
| 4,125,581 A | * | 11/1978 | Rasmussen | 264/49 |
| 4,626,390 A | * | 12/1986 | Li et al. | 264/46.1 |

* cited by examiner

*Primary Examiner*—Morton Foelak
(74) *Attorney, Agent, or Firm*—Jenkins, Wilson & Taylor, P.A.

(57) ABSTRACT

A method of preparing a porous fiber, the method including blending a natural polymer having a thermal stability with a synthetic polymer having a thermal stability, wherein the thermal stability of the natural polymer is different from the thermal stability of the synthetic polymer, and wherein the natural polymer and synthetic polymer from immiscible phases; extruding the blended polymers while heating at a predetermined heating rate to the fiber spinning temperature; spinning the fibers while maintaining the temperature; and heating the fibers at a heating rate that maintains the natural polymer in a fiber form and that removes the synthetic polymer, whereby a porous fiber is formed.

9 Claims, 2 Drawing Sheets

POROUS FIBERS FROM NATURAL/SYNTHETIC POLYMER BLENDS

CROSS REFERENCE TO RELATED APPLICATIONS

The present patent application is based on and claims priority to U.S. Provisional Application Serial No. 60/340,346, entitled "POROUS FIBERS FROM NATURAL/SYNTHETIC POLYMER BLENDS", which was filed Dec. 14, 2001 and is incorporated herein by reference in its entirety.

FIELD OF THE INVENTION

The present invention generally relates to the preparation of porous fibers. More particularly, the present invention provides a method of preparing a porous fiber from natural/synthetic polymer blends, to a porous fiber, and to a composition for use in preparing the fiber.

| Table of Abbreviations | |
|---|---|
| ° C. | degrees Celsius |
| CHT | continuous-heating-transformation |
| DSC | differential scanning calorimetry |
| h | hour(s) |
| HPC | hydroxypropyl cellulose |
| HWKL | hardwood Kraft lignin |
| IV | intrinsic viscosity |
| LDPE | low density polyethylene |
| min | minute(s) |
| MW | molecular weight |
| PE | polyethylene |
| PELL | pellethane |
| PEO | poly(ethylene oxide) |
| PET | poly(ethylene terephthalate) |
| PHEMA | 2-hydroxyethyl methacrylate |
| PMMA | polymethylmethacrylate |
| PP | polypropylene |
| $T_g$ | glass transition point |
| $T_m$ | melting point |

BACKGROUND ART

Polymer blending is a convenient method to develop products with desirable properties. The chemical and physical properties of the polymer blends are dependent on monomer type(s), molecular weight, and distribution of the respective polymers (Paul, D. R., Bucknall, C. B., Eds. *Polymer blends*; Wiley: New York, 2000). Most polymers are immiscible due to low entropy of mixing (Paul, D. R., Bucknall, C. B., Eds. *Polymer blends*; Wiley: New York, 2000; Flory, P. J. *J. Chem. Phys.*, 10, 51 (1942); 3. Huggins, M. L. *J. Chem. Phys.*, 9, 440 (1941)). Only through specific intermolecular interactions can favorable polymer blending occur and composite materials with desirable properties be produced. Nonetheless, a large number of technologically interesting polymers are multiphase inhomogeneous materials (Alexander-Katz, R. In *Polymer blends*; Paul, D. R.; Bucknall, C. B., Eds.; Wiley: New York, 2000, p 301–334). Properties such as prevention and control of gas and liquid permeation, gas and liquid adsorption/desorption and transmission and reflection of light are dependent on phase behavior, and more specifically on the size of the domains within the material.

Lignin, second only to cellulose in natural abundance, is an amorphous natural polymer existing in the cell wall of plants (Northey, R. A.; Glasser, W. G.; Schultz, T. P. *Lignin: historical, biological, and materials perspectives*; American Chemical Society: Washington, D.C., 2000). Its utilization in solid material systems is constrained by the extensive crosslinking, strong intramolecular interactions and high molecular weight of most lignins, which upon heating decompose rather than soften and flow. Attempts have been made, through polymer blending (Olabisi, O.; Robeson, L. M.; Shaw, M. T. *Polymer-polymer miscibility*; Academic Press: New York, 1979; Walsh, D. J.; Higgins, J. S.; Maconnachie, A.; North Atlantic Treaty Organization. Scientific Affairs Division. *Polymer blends and mixtures*; M. Nijhoff: Dordrecht; Boston, 1985; Meister, J. J.; Chen, M. J.; Milstein, O.; Gersonde, R.; Huttermann, A. *Abstr. Pap. Am. Chem. Soc.*, 209, 116-PMSE (1995); Rials, T. G.; Wolcott, M. P. *Journal of Materials Science Letters*, 17, 317–319. (1998); Tan, T. T. M. *Journal of Polymer Materials*, 13, 195–199. (1996); Thring, R. W.; Vanderlaan, M. N.; Griffin, S. L. *Biomass & Bioenergy*, 13, 125–132.(1997); Wang, J. S.; Manley, R. S.; Feldman, D. *Progress in Polymer Science*, 17, 611–646.(1992); Li, Y.; Sarkanen, S. In *Lignin: Historical, Biological, and Materials Perspectives*; Amer Chemical Soc: Washington, 2000, p 351–366) or lignin derivatization (Li, Y.; Sarkanen, S. In *Lignin: Historical, Biological, and Materials Perspectives*; Amer Chemical Soc: Washington, 2000, p 351–366; Sudo, K.; Shimizu, K.; Nakashima, N.; Yokoyama, A. *J. Appl. Polym. Sci.*, 48, 1485–1491.(1993); Kanazawa, K.; Koyama, M. *Mokuzai Gakkaishi*, 37, 869–873 (1991); Jain, R. K.; Glasser, W. G. *Holzforschung*, 47, 325–332 (1993); Glasser, W. G.; Jain, R. K. *Holzforschung*, 47, 225–233 (1993)), to alter the lignin's viscoelastic properties and allow for flow. However, significant room for improvement remains in the art, particularly in the area of producing fibers from lignin.

Accordingly, there exists a need for compositions and methods that can be used, among other applications, in producing porous fibers in an economically and environmentally acceptable manner, such as through the use of an abundant material like lignin. The present invention addresses these and other needs in the art.

SUMMARY OF INVENTION

A method of preparing a porous fiber is disclosed herein. In one embodiment, the method comprises: (a) blending a natural polymer having a thermal stability with a synthetic polymer having a thermal stability, wherein the thermal stability of the natural polymer is different from the thermal stability of the synthetic polymer, and wherein the natural polymer and synthetic polymer form immiscible phases; (b) extruding the blended polymers while heating at a predetermined heating rate to a fiber spinning temperature; (c) spinning the fibers while maintaining the temperature; and (d) heating the fibers at a heating rate that maintains the natural polymer in a fiber form and that removes the synthetic polymer, whereby a porous fiber is formed. A porous fiber is also disclosed herein.

Optionally, the natural polymer is lignin. Also optionally, the synthetic polymer is a polyolefin, such as polyethylene or polypropylene. The natural polymer can optionally be present in an amount ranging from about 25% to about 99% by weight; and the synthetic polymer can optionally be present in an amount ranging from about 1% to about 75% by weight.

Accordingly, it is an object of the present invention to provide a method of preparing a porous fiber from natural/synthetic polymer blends, a porous fiber, and a composition for use in preparing the fiber. The object is achieved in whole or in part by the present invention.

An object of the invention having been stated herein above, other objects will become evident as the description proceeds when taken in connection with the accompanying Examples and Drawings as best described herein below.

BRIEF DESCRIPTION OF THE DRAWINGS

FIG. 3A shows a fiber prior to thermal treatment. It has been stretched to produce fractures along the fiber. The inset shows the "stringy" polypropylene phase dispersed throughout the lignin phase at a point of fracture.

FIG. 3B shows a fiber after thermal treatment. It has been cut at a 30° angle with respect to the fiber axis to show the extent of the porous structure and the hollow core nature of the fiber.

DETAILED DESCRIPTION OF THE INVENTION

Figure 1:
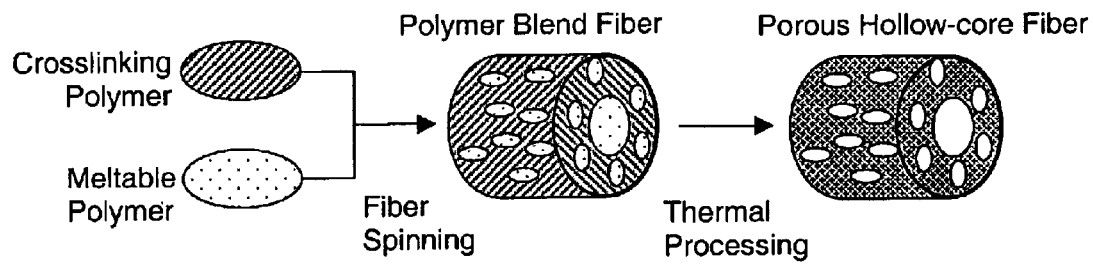
FIG. 1 is a schematic (Scheme 1) of the production of porous fibers from the thermal treatment of immiscible polymer blended fibers containing a meltable polymer and a thermally stable polymer.

Fibers with core-shell morphology are formed through manipulation of processing conditions and/or blend composition, in accordance with the present invention. An aspect of the present method for the production of porous lignin fibers is based on the differences in thermal stabilities of polymers (Scheme 1, FIG. 1). The method uses selected polymers with different thermal stabilities, i.e., one tends to cross-link at high temperatures while the other one melts and flows from within the fiber. If the affinities of the two polymers are weak enough, they will form an immiscible two phase material. Thermal treatment produces pores because of the melting or pyrolysis of the low melting polymer. At high levels of the low melting polymer, hollow fibers are formed. Manipulating the composition of the polymer blends provides for fibers with tailored porous and/or hollow core morphology. For convenience, the term "porous", as used herein including in the claims, is thus meant to refer to porous and/or hollow core morphology.

The present invention thus pertains to a method of preparing a porous fiber from natural/synthetic polymer blends, to a porous fiber, and to a composition for use in preparing the fiber. Lignin is a preferred natural polymer, and cellulose can also be employed. Representative lignins include hardwood lignin, hardwood Kraft lignin, softwood lignin, softwood Kraft lignin and organosolve lignin, i.e., Alcell lignin. Optionally, the lignin is non-acid washed lignin and/or raw, unpurified lignin. Thus, purifying the lignin is not a required step, but optionally can be performed.

Polyolefins, polyethylene (PE) (including low density PE, i.e. LDPE) and polypropylene (PP), are one class of synthetic polymer for use in the present invention. Representative synthetic polymers further include poly(ethylene terephthalate) (PET) and poly(ethylene oxide) (PEO). Representative synthetic polymers also include but are not limited to polymethylmethacrylate (PMMA), pellethane (a commercial polyurethane, PELL), 2-hydroxyethyl methacrylate (PHEMA), nylon, polyurethane, polystyrene, polysulfone, polyester, polyhydroxyacids, polycarbonate, polyimide, polyamide, polyamino acids, and combinations thereof. Various molecular weights of each of the synthetic polymers can also be employed. Ease of fiber spinning can also vary, and can depend on tacticity and melt index of the synthetic polymer. As used herein the term "synthetic" also encompasses modified natural polymers, such as but not limited to hydroxypropyl cellulose (HPC) and cellulosics, particularly where the modified natural polymers have desired thermal stability characteristics.

In one embodiment, a method of preparing a porous fiber comprises blending a natural polymer having a thermal stability with a synthetic polymer having a thermal stability. The thermal stability of the natural polymer is different from the thermal stability of the synthetic polymer. Additionally, the natural and synthetic polymers form two immiscible phases and the two immiscible phases are maintained at a fiber-spinning temperature. The blended polymers are extruded while heating the blended composition at a predetermined heating rate to a fiber-spinning temperature. In this context, the term "predetermined heating rate" is meant to refer to a controlled heating rate characterized by slow increases in temperature until fiber formation occurs while the blended polymers are extruded. The fiber-spinning temperature is thus the temperature at which fibers form, and fiber spinning is then carried out isothermally at the fiber-spinning temperature. The spinning temperature is closely related to the molten viscosity of the sample. That is, a low spinning temperature is indicative of a low molten viscosity, and a higher spinning temperature is indicative of a higher molten viscosity. Additional guidance in the spinning of the fibers at the fiber-spinning temperature is provided in the Examples presented below.

Conventional equipment can be employed in the spinning of the fibers such as a mixer/extruder available from Atlas Electric Device Company of Chicago, Ill., United States of America. In such equipment, rotor temperatures typically range from about 120° C. to about 180° C. and nozzle temperatures typically range from about 150 to 235° C., each temperature range depending on the blend ratios of natural to synthetic polymers and depending on which synthetic polymers are employed. Table 1 provides representative spinning temperatures for hardwood Kraft lignin and a series of synthetic polymers.

TABLE 1

Lignin-Synthetic Polymer Blends
Table of lignin-blend spinning conditions

| Blend Ratio (%) | | Spinning Temperature (° C.) | |
|---|---|---|---|
| HW Kraft | PEO (100) | Rotor | Nozzle |
| 100 | — | 185 | 225–235 |
| 95 | 5 | 180 | 214–225 |
| 87.5 | 12.5 | 170 | 191–200 |
| 75 | 25 | 140 | 150–180 |
| HW Kraft 75 | PET 25 | 190 | 210–242 |
| HW Kraft 75 | PP 25 | 120 | 210–220 |

The fibers are heated at a heating rate that maintains the natural polymer in a fiber form and that removes the synthetic polymer to thereby form a porous fiber. In one embodiment the temperature that is ultimately reached through heating at the heating rate is a temperature at which the natural fiber is cross-linked and at which the synthetic fiber is removed by melting and/or pyrolysis. The heating rate can be further described as a rate that is sufficiently slow and controlled so that the fibers in contact with each other are not fused together. That is, at a heating rate that is too drastic, cross-linking reactions are not able to maintain the glass transition temperature of the natural fiber above the overall temperature of the process, and such heating rates should be avoided. A heating rate that is too drastic thus results in the fiber material devitrifying and entering a liquid rubbery state that is tacky and that fuses together.

A desired heating rate is a rate at which the glass transition temperature of the natural fiber increases faster than the temperature of the overall process to thereby maintain the fiber material in a glassy and non-tacky state. Thus, a representative heating rate that maintains the natural polymer in a fiber form and that removes the synthetic polymer is a rate that provides for the glass transition temperature of the natural polymer to exceed the overall temperature of the process. Further guidance concerning heating rates can be found in the Examples presented below.

An aspect of the present method involves the thermal removal of the synthetic polymer from the polymer blend to provide a porous and/or hollow core fiber. As long as temperatures are maintained below the thermal decomposition temperature, but above the melting temperature of the synthetic polymer, an additional step wherein the synthetic polymer is recovered and recycled is also provided. Fiber produced by the present method can be stored on a spool or in another suitable manner.

The blend ratios (usually percent by weight) of the natural polymer to the synthetic polymer can comprise any desired value, and are typically chosen based on the envisioned end use for the fibers that are being prepared. For example, the natural polymer can be present in an amount ranging from about 25% to about 99% by weight; and the synthetic polymer is present in an amount ranging from about 1% to about 75% by weight.

By way of additional example, the percentage of natural fiber in the blend can comprise 95%, 90%, 87.5%, 85%, 80%, 75%, 70%, 62.5%, 60%, and 50%. Correspondingly, the percentage of synthetic polymer in the blend ratio can comprise 5%, 10%, 12.5%, 15%, 20%, 25%, 30%, 37.5%, 40% and 50%. Indeed, in certain embodiments, the above-listed percentages of natural polymer and synthetic polymer can be reversed so that synthetic polymer comprises the majority of the composition that is to be spun into fibers and subsequently thermally treated to prepare porous fibers.

The porous fibers prepared in accordance with the present invention can be employed in a variety of applications. Representative applications include the use of the fibers in composite reinforcement as well as insulating materials in a variety of settings. Additionally, the porous fibers can be used in activated carbon and gaseous separation applications, due to the increased surface area provided by the pores in the fibers. Other applications would be apparent to one of ordinary skill in the art upon review of the present disclosure.

Following long-standing patent law convention, the terms "a" and "an" mean "one or more" when used in this application, including the claims.

The term "about", as used herein when referring to a value or to an amount of mass, weight, time, volume, or percentage is meant to encompass variations of ±2%, preferably ±1%, more preferably ±0.5%, and still more preferably ±0.1% from the specified amount, as such variations are appropriate to perform the disclosed methods or to prepare the disclosed compositions.

EXAMPLES

The following Examples have been included to illustrate modes of the invention. Certain aspects of the following Examples are described in terms of techniques and procedures found or contemplated by the present co-inventors to work well in the practice of the invention. These Examples illustrate standard laboratory practices of the co-inventors. In light of the present disclosure and the general level of skill in the art, those of skill can appreciate that the following Examples are intended to be exemplary only and that numerous changes, modifications, and alterations can be employed without departing from the scope of the invention.

Example 1

Blends of Alcell lignin and polypropylene (PP) (melt index 0.45), PET (IV 0.57) and PEO (MW 100,000, 300,000, 600,000) were successfully melt extruded using a laboratory mixing extruder at operating temperatures of 120–280° C., 20–30 rpm rotation speeds, and with a round single hole die (3.175 mm diameter). The fibers were quenched at room temperature and wound on a bobbin at 60–80 m/min. Lignin/PEO (MW 100,000) 50/50, 70/30, 75/25 mixtures that were blended at 240° C. had good spinability but excellent spinability was realized by lowering the blending temperature to 160°–200° C. for the 75/25 blend. Tenacities of ~2 g/d, initial moduli of 40 g/d and elongations at break as high as 300–400% were obtained. Significantly, all of the DSC thermograms of the various blends had an endotherm at ~160° C. and on cooling an exotherm at ~115° C. suggesting the formation of a crystalline phase common to all of the blends.

Example 2

Blends of kraft lignin (softwood and hardwood) and PP (isotactic and syndiotactic—melt index 0.5–35), PET (IV 0.57) and PEO (MW 100,000, 300,000, 600,000) were prepared by melt spinning at operating temperatures of 120–280° C. The lignin was used with and without desalting by acid washing. Blend ratios (lignin/polymer) of 99/1, 98/2, 95/5, 90/10, 87.5/12.5, 80/20, 75/25, 70/30, 60/40, 50/50, 40/60 were prepared. The polymer structure and tacticity affected the ability to prepare fibers. Fiber spinning became easier with increasing synthetic polymer blend content. PEO molecular weight had little effect on fiber spinning. The isotactic PP/lignin blends were easier to spin than the syndiotactic PP/lignin blends.

Example 3

In this Example a commercial technical lignin and polypropylene were selected as the thermally stable polymer and thermally unstable one, respectively. Porous hollow-core fibers were produced from these mixtures.

Hardwood Kraft lignin, HWKL (Westvaco Corp. of Charleston, S.C., United States of America) was desalted and thermally processed prior to fiber blending using a previously published method, (Kadla, J. F.; Kubo, S.; Gilbert, R. D.; Venditti, R. A.; Griffith, W.; Compere, A. L. Carbon, 40, 2913–2920 (2002)) and mechanically blended with polypropylene (PP, syndiotactic, $\overline{M}w$~127,000—Aldrich Chemical Company of Milwaukee, Wis., United States of America). The blend ratios were set at 87.5/12.5, 75/25, 50/50 (HWKL/PP) by weight. Control fibers were made with no PP and no lignin.

The samples were then extruded in a mixer/extruder from Atlas Electric Device Company with a ⅟₃₂-inch spinneret to produce fine fibers. The optimal temperatures for fiber production were obtained by slowly increasing the temperature until fiber formation occurred. Fiber spinning was then performed isothermally at that temperature. The spinning temperature is closely related to the molten viscosity of the sample; a low spinning temperature is indicative of a low molten viscosity. The spinning temperature was 220° C. for the HWKL and did not decrease with increasing PP content (from 5 to 100%).

Figure 2:
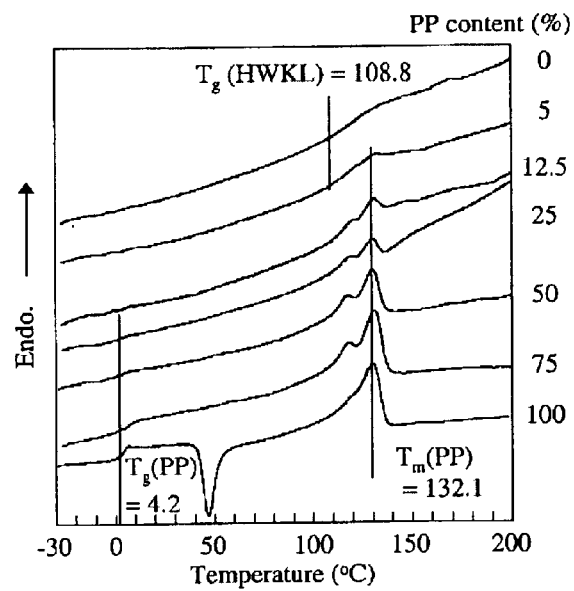
FIG. 2 is a plot depicting differential scanning calorimetry (DSC) profiles of lignin-PP fibers of varying lignin/PP ratios.

Phase immiscibility in the lignin-PP blend is shown in FIG. 2, in which a melting point ($T_m$) and glass transition point ($T_g$) of the PP phase and a $T_g$ of the lignin phase are distinctly observed at all ratios of lignin/PP. Further, the $T_g$ of the lignin and PP phases appear independent of the lignin/PP ratio, further indicating negligible mixing of the two polymers.

The spun fibers were heated to 250° C. to remove the polypropylene and induce crosslinking of the lignin phase. Upon heating the PP flowed from the fiber and was visually observed to pool outside of the fiber. Fiber stability was dependent on heating rate and PP blend content. Increasing the heating rate above 1.5° C. min$^{-1}$ resulted in the fibers in contact with one another and fusing together. As the temperature increased at a heating rate below 1.5° C. min$^{-1}$ the $T_g$ of the lignin increases faster than the temperature, maintaining the material in the glassy state ($T_g$>T): non-tacky. At heating rates above 1.5° C. min$^{-1}$, the crosslinking reactions are not able to maintain $T_g$>T and the material devitrifies entering the liquid rubbery state, tacky, and thus fuses together. Gillham and co-workers have described such phenomena in continuous-heating-transformation (CHT) diagrams (Wisanrakkit, G.; Gillham, J. K. *J. Appl. Polym. Sci.*, 42, 2453–2463 (1991)). Thus the thermoplastic character of the lignin is changed to thermosetting, enabling the lignin fibers to maintain fiber form while the PP is removed.

Figure 3A:
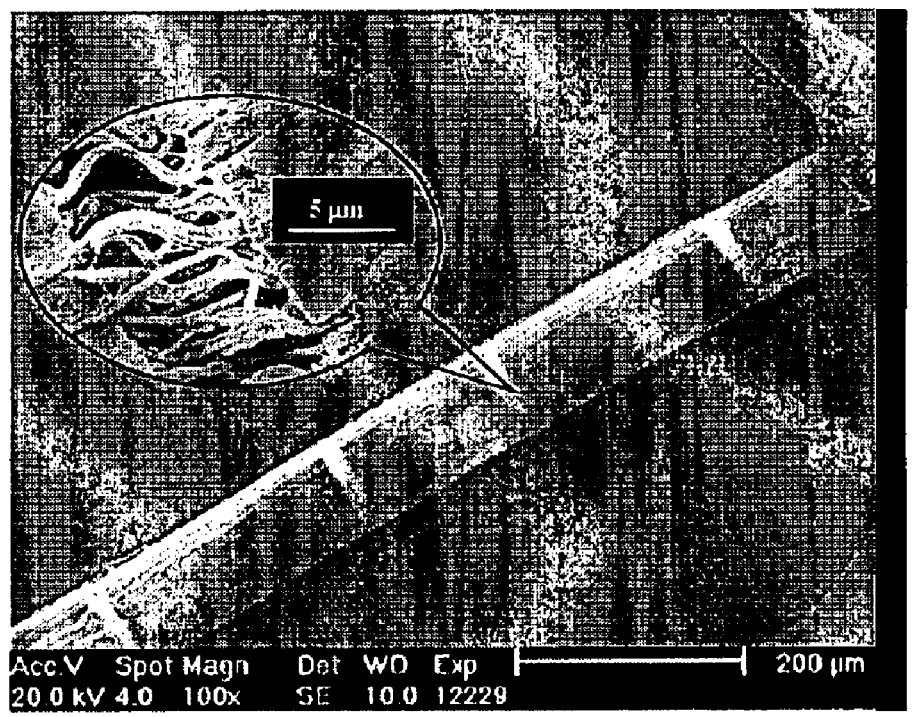
FIGS. 3A and 3B are scanning electron micrographs of HWKL/PP (75/25) fibers.
Figure 3B:
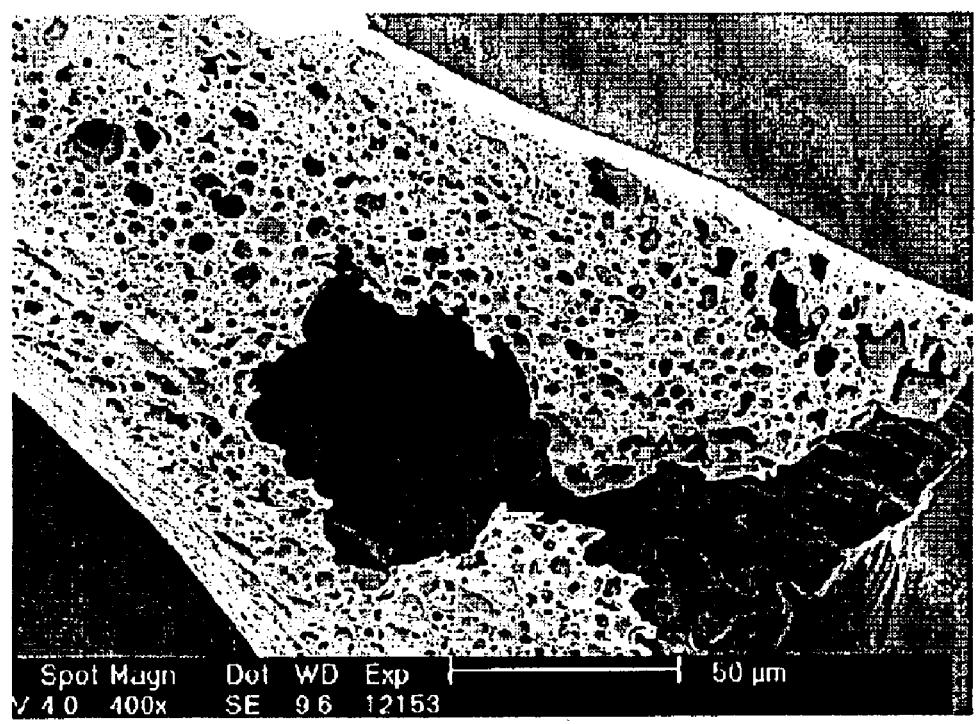

FIGS. 3A and 3B show the HWKL/PP (75/25) fibers before (FIG. 3A) and after (crosslinked fibers, FIG. 3B) thermal treatment. Stretching of the fibers (magnified inset, FIG. 3A) reveals the polypropylene phase as distinct "strings" dispersed throughout the lignin fiber. In the corresponding thermally treated fibers (FIG. 3B) the removal of the polypropylene phase(s) produces the observed porous microstructure.

In this Example the production of porous hollow fibers made from a wood-based biopolymer and a recyclable petrochemical polymer is disclosed. These fibers relative to solid lignin fibers have high specific surface area and a high flexural strength/mass ratio due to the lignin shell/hollow core morphology. Varying the mixing ratio, molecular weight and temperature can affect the dispersion of PP in the lignin matrix, along with the relation of the initial dispersion and the pore size distribution in the final product fibers, to provide additional characteristics of interest.

REFERENCES

The references listed below as well as all references cited in the specification are incorporated herein by reference to the extent that they supplement, explain, provide a background for, or teach methodology, techniques and/or compositions employed herein.

1. Paul, D. R.; Bucknall, C. B., Eds. *Polymer blends*; Wiley: New York, 2000.
2. Flory, P. J. *J. Chem. Phys.*, 10, 51.(1942).
3. Huggins, M. L. *J. Chem. Phys.*, 9, 440.(1941).
4. Alexander-Katz, R. In *Polymer blends*; Paul, D. R.; Bucknall, C. B., Eds.; Wiley: New York, 2000, p 301–334.
5. Northey, R. A.; Glasser, W. G.; Schultz, T. P. *Lignin: historical, biological, and materials perspectives*; American Chemical Society: Washington, DC, 2000.
6. Olabisi, O.; Robeson, L. M.; Shaw, M. T. *Polymer-polymer miscibility*, Academic Press: New York, 1979.
7. Walsh, D. J.; Higgins, J. S.; Maconnachie, A.; North Atlantic Treaty Organization. Scientific Affairs Division. *Polymer blends and mixtures*; M. Nijhoff: Dordrecht; Boston, 1985.
8. Meister, J. J.; Chen, M. J.; Milstein, O.; Gersonde, R.; Huttermann, A. *Abstr. Pap. Am. Chem. Soc.*, 209, 116-PMSE.(1995).
9. Rials, T. G.; Wolcott, M. P. *Journal of Materials Science Letters*, 17, 317–319.(1998).
10. Tan, T. T. M. *Journal of Polymer Materials*, 13, 195–199.(1996).
11. Thring, R. W.; Vanderlaan, M. N.; Griffin, S. L. *Biomass & Bioenergy*, 13, 125–132.(1997).
12. Wang, J. S.; Manley, R. S.; Feldman, D. *Progress in Polymer Science*, 17, 611–646.(1992).
13. Li, Y.; Sarkanen, S. In *Lignin: Historical, Biological, and Materials Perspectives*; Amer Chemical Soc: Washington, 2000, p 351–366.
14. Sudo, K.; Shimizu, K.; Nakashima, N.; Yokoyama, A. *J. Appl. Polym. Sci.*, 48, 1485–1491.(1993).
15. Kanazawa, K.; Koyama, M. *Mokuzai Gakkaishi*, 37, 869–873.(1991).
16. Jain, R. K.; Glasser, W. G. *Holzforschung*, 47, 325–332. (1993).
17. Glasser, W. G.; Jain, R. K. *Holzforschung*, 47, 225–233. (1993).
18. Kadla, J. F.; Kubo, S.; Gilbert, R. D.; Venditti, R. A.; Griffith, W.; Compere, A. L. *Carbon*, 40, 2913–2920 (2002).
19. Kadla, J. F.; Kubo, S.; Venditti, R. A.; Gilbert, R. D. *Polymer Preprints—PMSE*. (2001).
20. Wisanrakkit, G.; Gillham, J. K. *J. Appl. Polym. Sci.*, 42, 2453–2463.(1991).

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of preparing a porous fiber, the method comprising:
    (a) blending a natural polymer having a thermal stability with a synthetic polymer having a thermal stability, wherein the thermal stability of the natural polymer is different from the thermal stability of the synthetic polymer, and wherein the natural polymer and synthetic polymer form immiscible phases;
    (b) extruding the blended polymers while heating at a predetermined heating rate to a fiber spinning temperature;
    (c) spinning the fibers while maintaining the temperature; and
    (d) heating the fibers at a heating rate that maintains the natural polymer in a fiber form and that removes the synthetic polymer, whereby a porous fiber is formed.

2. The method of claim 1, wherein the natural polymer is lignin.

3. The method of claim 1, wherein the synthetic polymer is a polyolefin.

4. The method of claim 3, wherein the synthetic polymer is polyethylene or polypropylene.

5. The method of claim 1, wherein:
    (a) the natural polymer is present in an amount ranging from about 25% to about 99% by weight; and (b) the synthetic polymer is present in an amount ranging from about 1% to about 75% by weight.

6. The method of claim 5, wherein the natural polymer is lignin.

7. The method of claim 5, wherein the synthetic polymer is a polyolefin.

8. The method of claim 7, wherein the synthetic polymer is one of polypropylene and polyethylene.

9. A porous fiber produced by the method of claim 1.

* * * * *